2 Sheets—Sheet 1.

J. FARRELL.

MACHINE FOR MAKING ELECTRIC CABLES.

No. 10,401. Reissued Nov. 6, 1883.

Witnesses:
T. C. Brecht
C. L. Parker

Inventor
John Farrell
By George H. Christy
Attorney

J. FARRELL.

MACHINE FOR MAKING ELECTRIC CABLES.

No. 10,401. Reissued Nov. 6, 1883.

Witnesses:
T. C. Brecht.
C. L. Parker.

Inventor
John Farrel.
By George H. Christy
Attorney.

UNITED STATES PATENT OFFICE.

JOHN FARRELL, OF PITTSBURG, PENNSYLVANIA.

MACHINE FOR MAKING ELECTRIC CABLES.

SPECIFICATION forming part of Reissued Letters Patent No. 10,401, dated November 6, 1883.

Original No. 262,027, dated August 1, 1882. Application for reissue filed September 29, 1882.

DIVISION A.

*To all whom it may concern:*

Be it known that I, JOHN FARRELL, a citizen of the United States, residing at Pittsburg, county of Allegheny, State of Pennsylvania, have invented or discovered a new and useful Improvement in Machines for Making Electric Cables; and I do hereby declare the following to be a full, clear, concise, and exact description thereof, reference being had to the accompanying drawings, making a part of this specification, in which—like letters indicating like parts—

Figure 1:
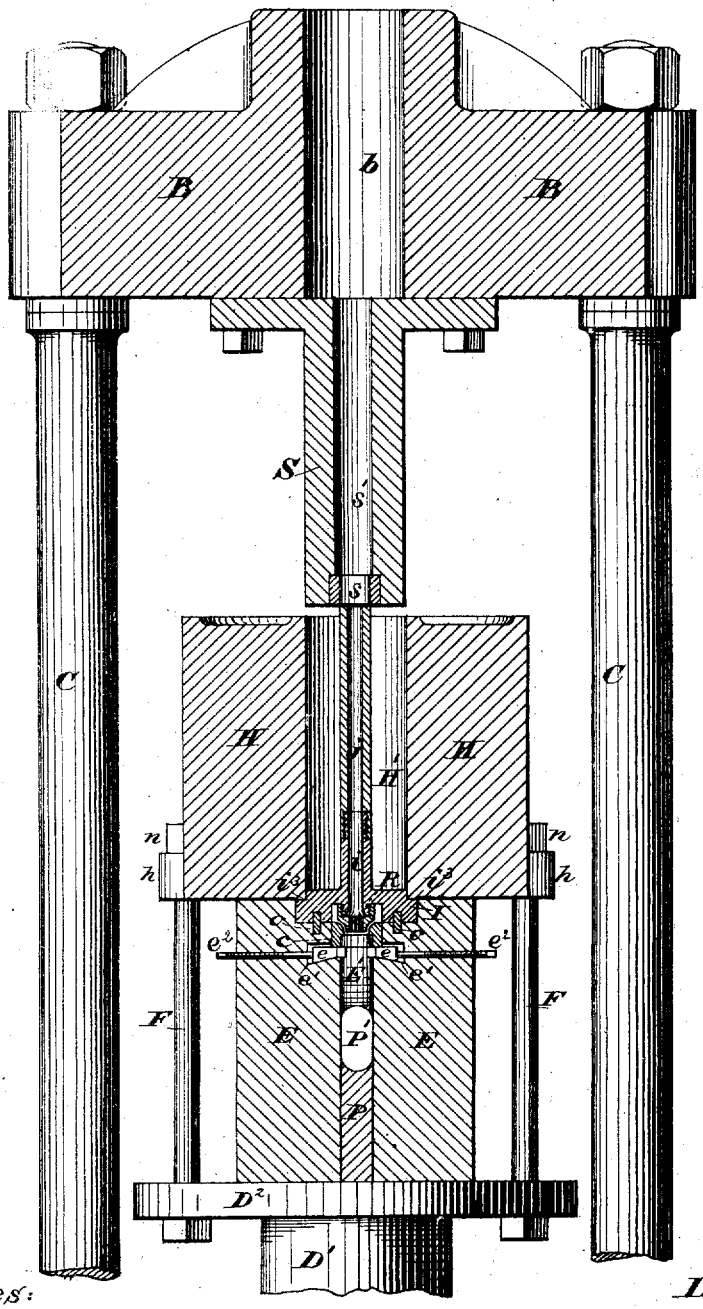
Figure 2:
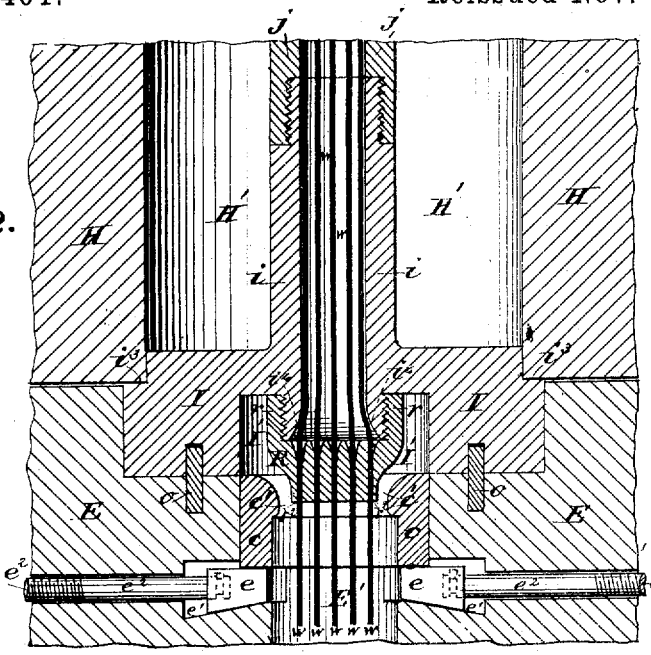
Figure 6:
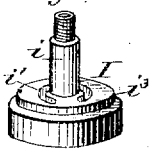
Figure 3:
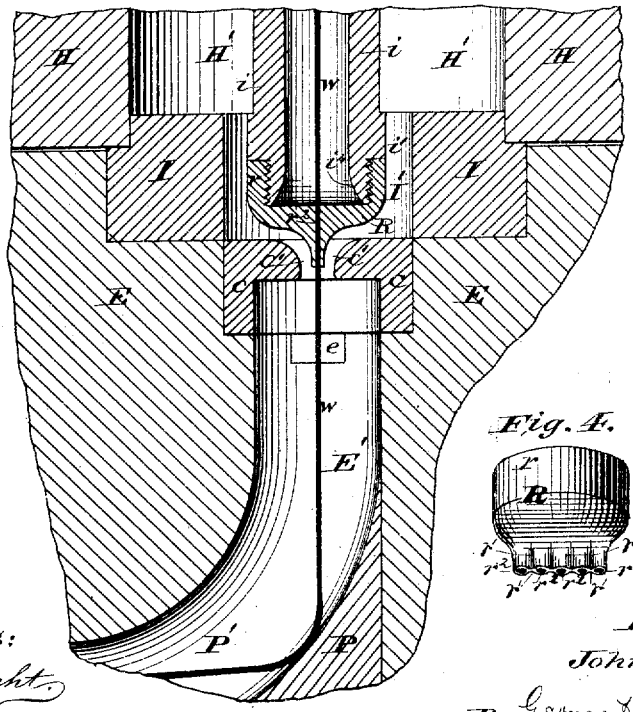
Figure 5:
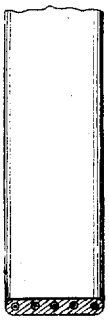
Figure 4:
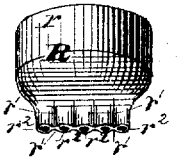

Figure 1, Sheet 1, is a view in sectional elevation of my improved machine. Fig. 2, Sheet 2, is a vertical sectional view, to an enlarged scale, of the die, mandrel, mandrel-head, and surrounding devices, the section being in the same plane as Fig. 1. Fig. 3 is a sectional view of the parts shown in Fig. 2, the plane of section being at right angles to that of Figs. 1 and 2. Fig. 4 is a perspective view of the mandrel or wire-guard. Fig. 5 is a perspective view of a piece of conductor formed by my improved machine; and Fig. 6 is a perspective view, to a reduced scale, of the mandrel head or support.

My invention relates to certain improvements in machines for covering electric-circuit wires with a body of lead, and more particularly to that class of machines embodying the well-known principles of construction and operation employed in lead-pipe machines. Such machines usually consist of a hydraulic cylinder and piston for imparting power and motion, a cylinder for containing the lead, a die and core for forming the pipe-like article, and a ram or plunger for forcing the lead out of its cylinder through the die, and when employed for covering wires with lead a hollow core has been used for spacing the wires (two or more) while the lead covering is formed on them.

My invention consists in the construction and combination of the mandrel with its supporting-head and with the die and cylinder, as hereinafter more fully described and claimed. In covering circuit-wires with lead it is highly important that the die and mandrel should remain in fixed immovable relationship as regards each other, in order to secure a good and uniform product.

In machines of this class as heretofore constructed serious difficulty has been experienced in maintaining the mandrel and die in proper relationship for doing such work successfully, owing to the yielding or stretching of the framework and other supports for these parts under the immense pressure employed.

The purpose of my invention is to obviate these difficulties, and this I do by a machine constructed as follows:

On the upper end of piston-stem D′ of any suitable hydraulic ram is fixed a platen, $D^2$, which carries a hollow bed-block, E, and lead-cylinder H. These parts E and H are secured to the platen by bolts F in any desired number.

In Figs. 1, 2, and 3 the block E is shown larger than the lead-chamber H′, and forms the immediate under support for the lead-cylinder, the two being rigidly connected by the bolts to the platen.

At the upper end of tubular passage E′ of block E is seated a die, *c*, having a central opening, *c′*, therein, corresponding in form to the desired exterior form of the cable or conductor. This die is adjusted vertically by wedges *e*, moving in recesses *e′* and operated by screw-rods $e^2$, as represented in Figs. 1 and 2. The pressure upon this die is downward. Consequently it will be held to its seat thereby.

Immediately above the die *c* is a mandrel head or support, I, carrying a hollow stem, *i*. The upper face of this head closes the end of the chamber H′, and forms substantially a bottom for such chamber. Openings *i′ i′* in any desired number are provided on either side of the stem *i*, which permit passage of lead from chamber H′ to the under side of the head and to die *c*. I prefer to make the upper part of this head of proper size to fit closely within chamber H′, with a shoulder, $i^3$, below, adapted to fit under the cylinder-block H, whereby the head is held in place, so as to prevent lead from entering between its under face and its seat, thereby disturbing the accuracy of adjustment required between the die and mandrel, as hereinafter described. A chamber, I′, is made in the under face of this head, directly over the die *c*, and on a threaded pipe-like projection, $i^4$, is screwed a hollow mandrel, R. The threaded socket *r* of this mandrel is by preference made cylindrical, as in Fig. 4, and its lower end or point is reduced to a form corresponding to and adapted to enter the opening *c'* of die *c*. In the lower extremity of this mandrel are made perforations $r^2$, through which the electric conducting-wires *w w* are passed. These perforations may be of any desired number corresponding to the number of wires required therein. On the surface of the mandrel, between perforations, are made grooves or corrugations *r'*, which increase in depth toward the extremity. The purpose of these grooves or channels is to give direction to the flow of lead past the mandrel into the spaces between the wires, thereby affording an unbroken wall or body of lead between and around each wire when such form of product may be desired. Heretofore a core or mandrel has been employed having separate tubular nipples extending downward into the die, through which the wires were passed, and the lead covering was given its tubular form around each wire above the points of the nipples. In such construction considerable space is occupied by the separate nipple-walls and by the openings between them. Consequently the wires cannot be brought close together in the cable, and a large amount of lead is required for covering a comparatively small number of wires. In my improved mandrel I do not employ the separate nipples, but simply form grooves in the outer surface, which give direction to the flow of lead, and the lead is formed into a tubular covering around each wire below the point of the mandrel. By this means I can make the wire-perforations much closer together than heretofore, and consequently can cover a much larger number of wires with a given amount of lead. This in practice is a very important improvement, reducing materially the cost of such cables, since the lead employed forms the principal item of expense in construction. The hollow stem *i*, through which the wires *w* are carried, is extended by a pipe, *j*, upward through the lead-chamber H'.

A tubular ram or plunger, S, adapted in form to enter and fill closely the chamber H', is rigidly bolted to the cross-head B, with its central passage, *s'*, in line with the pipe *j* below and the hole *b* above, through the cross-head. The passage thus provided to and through the mandrel may be used not only for inserting wires, as stated above, but also as a receptacle for insulating material with which to coat or cover the wires, as hereinafter described.

In the lower end of ram S is seated a die, *s*, adapted to receive and fit closely upon the pipe *j*, so as to prevent escape of lead between the die and pipe. Above the die the passage *s' b* may be somewhat larger than the pipe, thereby confining friction-surface to the bearing of the die.

In the operation of this machine the wires *w* are passed downward through perforations $r^2$ into the passage E'. The chamber H' is filled with lead, and while the charge is still hot—say as soon as it is set—power is applied to raise the piston D, and with it the block E and the devices resting thereon. As the plunger S enters the chamber H', the lead therein will be forced through the openings *i* in head I, and downward through the die *c*, and over and around the wires, thus forming a covering or body of lead upon them. The character of this covering will depend largely upon the relative positions of mandrel R and die *c*. For example, if the mandrel be inserted well into the die—say until the upper ends of the grooves *r'* are at or below the plane of greatest contraction in die-opening *c'*—the lead covering will be pipe-like or tubular in form, but flattened, the wires being inclosed within its interior walls in one common passage or opening. By lowering the die, so that the grooves *r'* are in or slightly above the die-opening, the lead will be forced into the spaces between the wires, thus surrounding each wire separately by a solid body of lead, as represented in Fig. 5. In this operation one function or purpose of the grooved mandrel R is to form the separate tubular passages in the body of lead which the wires occupy, and by adjusting the die at proper height with relation to it the wires may be covered loosely or the lead may be pressed closely thereon, as desired. The range of adjustment required to effect such differences of result is small, and in view of this it is of great importance not only to provide means for accurate adjustment between the die and mandrel, which I have done by making the die adjustable, as described, in order to cause the lead to press the wires with the desired degree of tension, but it is also important that this adjustment, which in practice must be given when the apparatus is not at work, shall remain fixed and unchanged when the parts are subjected to the heavy pressure required in doing such work. This latter feature of stability is fully secured by my improvement, and by means of it and the facility afforded for accurate adjustment I am enabled to apply a lead covering to wires previously covered with insulating material without injury thereto.

It will be observed that the head I, which carries the mandrel, exposes a greater area to pressure of lead on its upper face than on its lower face, or that downward pressure upon the head is greater than upward pressure upon the head and mandrel. Consequently there will be an excess of pressure upon it in the same direction as upon die *c*; also, the die and mandrel-head are supported as against working-pressure by the same block of metal, or, in other words, that the resultant of lead-pressure upon each is in the same direction, and support is given to both as against such pressure by one and the same device. This support is direct, and the conditions are substantially the same for each. Consequently they will be effected in the same manner by any working-pressure, great or small, and their relative adjustment will remain unchanged, except as change is made intentionally by the means provided for that purpose.

In illustrating my improvement, Sheets 1 and 2, I have shown the die and head supported on and movable with the piston D′; but this feature of construction may be varied without departing from my invention. For example, the block E may rest on a solid bed, and the ram S be made movable and connected with the piston. In such case the cylinder H, head, and die would be stationary; but the relationship of these parts, both in adjustment and stability, would remain as in the form shown, or as described and claimed in Division B of this reissue. The block E may be made, like ram S, to enter chamber H′, the head being bolted to it, as at *u*, and both the die and head being supported on it substantially as before. Still I prefer the construction shown, on account of the facility with which the mandrel or wire-guard may be reached in case a wire should become broken or injured. To this end the cylinder H may be raised and supported by blocking or by friction of plunger S, the nuts *n* be loosened, and the block E, with die *c*, be lowered. The head I, owing to the tightness of its fit in chamber H′, will be held up, thus enabling the workmen to reach the wires below the mandrel without difficulty. On replacing the parts the dowel-pins *o* will insure their return to proper position with relation to each other.

By using dies and mandrels of suitable form conductors of various forms may be made, either flattened, as in Fig. 5, or more or less cylindrical. The flattened form is ordinarily preferred. As such conductor is formed in the machine, it is passed downward into the passage E′, and, being deflected by block P, (see Fig. 3,) or other suitable device placed in such passage, it is discharged laterally through side opening, P′. As it emerges from this opening, it may be wound on a reel, ready for use; or other disposition may be made of it, as desired.

By sealing or closing tightly the ends of the wire-passages in the conductor as it is delivered from the machine, and placing in the hollow stem *i j* an insulating substance which becomes fluid or plastic under heat—as pitch, asphaltum, paraffine, or equivalent substance—the wires may be coated thereby. In this operation heat is obtained directly from the body of lead, it being worked at a high temperature, and the insulating material, being rendered liquid or plastic thereby, will prevent the passage of air downward. Air-passage being thus arrested, there will, in the operation of forming the lead covering, be a tendency to form a vacuum in the wire-passages of the conductor. Consequently air-pressure from above will force the insulating material into such passages, filling them compactly and surrounding the wires with an insulating substance adapted to protect the wires from moisture and injury from other causes. The purpose of such covering additional to and within the lead covering is principally to protect the wire from such agencies as are liable to be conducted from without through the lead covering, and while it may be applied directly to a naked wire, yet I prefer to make use of insulated wires of the ordinary kinds, in which case this covering, embedded or packed in the wire-passages under air-pressure, as described, may act not only as a preservative, but also as an additional insulator. This method of covering wires with both insulating material and a body of lead, both being done under pressure in one operation and with one device, I consider an important improvement, and it may be practiced in connection with one or more wires inclosed within a common tube, or when two or more wires are separately embedded in a body of lead, as represented in Fig. 5, both such forms being made as desired by proper adjustment of the die and mandrel, as hereinbefore described. When one charge of lead is nearly exhausted from the cylinder, another may be supplied readily and quickly, and thus the lead-covered conductors may be formed of any desired length, limited only by facility for handling the same when finished.

I have shown the mandrel R screwed to the mandrel-head, thus forming a rigid attachment. It will be observed that the principal pressure upon this mandrel is upward, caused by the exudation of the metal, and it is obvious that other forms of connection may be employed, provided such connection affords a rigidity with respect to pressure from exuding metal. It will be observed that in the construction described the openings *i′ i′*, through which the lead passes in going from the lead-cylinder to the die-cavity, are arranged on sides of the stem *i* corresponding in position to the flattened sides of the mandrel. This is the preferable construction, because thus the metal passes directly to the sides of the series of wires, and has no tendency to throw them out of line or to crowd the edge wires over toward the center, which tendency would exist if the metal were forced down edgewise as regards the band of wires. The grooves *r′ r′* also perform a function in connection with the flow of lead in the guiding or spacing of the wires; but their use as regards such function, when separate spacing perforations are not employed, will be included in the subject-matter of a separate application.

I am aware that it has been proposed to space or separate wires in the process of covering them by forcing the covering material onto the wires at right angles to their longitudinal plane; but in my present invention the wires are held in proper relations by the separate perforations, and by directing the flow of lead by the side grooves, *r′*, the wires may be arranged at very close intervals and the expense involved in making separate pipe-like nipples for each wire be avoided.

I claim as my invention—

1. In a machine for forming lead-covered electric cables, the combination of a lead-cylinder, a tubular support, E, provided with die *c*, a mandrel-head, I, secured on the tubular support, and separated from and above the die, a tubular mandrel, R, secured to the head, and a tubular stem extending from the mandrel-head through the lead-cylinder, substantially as and for the purposes described.

2. The combination of a lead-cylinder and hollow piston, a tubular support, E, with die *c*, mandrel R, and mandrel-head I, such head being separate from and above the die, and having a tubular stem extending from the mandrel through the cylinder and piston, substantially as set forth.

3. The combination, with a lead-cylinder, H, and tubular support E, of a mandrel, R, fastened to a mandrel-head, I, which is rigidly secured between the cylinder and its support, substantially as and for the purposes described.

4. The combination of tubular support E, die *c*, mandrel R, mandrel-head I, and means, substantially as described, for giving the die independent movement toward and from the mandrel axially of the machine.

5. The combination of platen $D^2$, support E, cylinder H, bolts F, die *c*, mandrel R, and mandrel-head I, substantially as set forth.

6. In a machine having a lead-cylinder and piston, the combination of a tubular mandrel, having two or more separate wire-passages, with a mandrel-head, I, and a die, *c*, having a flat upper face for forcing the covering material onto the wires at right angles to their longitudinal plane, substantially as and for the purposes described.

7. A mandrel, R, having two or more separate passages, $r^2$, through the same, in combination with mandrel-head I, having a tubular stem, *i*, extending therefrom, and die *c*, having a flat upper face for forcing the covering material onto the wires at right angles to their longitudinal plane, substantially as set forth.

8. A mandrel, R, having two or more separate wire-passages, $r^2$, through its point, and a threaded socket, *r*, on its base, in combination with mandrel-head I, having a threaded projection, $i^2$, on its under face, and a tubular stem, *i*, extending from its upper face, substantially as set forth.

9. The mandrel-head I, having vertical openings or passages through the same, a tubular stem, *i*, extending from its upper face, and a tubular threaded projection, $i^2$, on its under face, for attachment of the mandrel, substantially as set forth.

10. The combination of lead-cylinder H, tubular support E, mandrel R, die *c*, sliding wedges *e*, and screw-rods $e^2$, substantially as described, whereby the die is made adjustable toward and from the mandrel.

11. In combination with the platen $D^2$, a tubular support, E, and lead-cylinder H, both being bound to the platen by bolts, as described, die *c*, secured on the support, mandrel-head I, secured above the die, mandrel R, secured to the head between the head and the die, and guides *o*, substantially as set forth, whereby provision is made for ready access to the mandrel between the die and the head.

12. The mandrel R, having a series of two or more perforations, $r^2$, side by side through its interior and intermediate grooves, $r'$, on its exterior surface, substantially as described, with reference to directing a flow of lead into the spaces between wires and the formation of a solid body of lead between and around the wires below the point of the mandrel.

13. The flattened tubular mandrel R, in combination with a mandrel-head, I, having passages *i i* through the same on sides corresponding to the flattened sides of the mandrel, substantially as set forth.

In testimony whereof I have hereunto set my hand.

JOHN FARRELL.

Witnesses:
R. H. WHITTLESEY,
C. L. PARKER.